United States Patent [19]

Nagata et al.

[11] Patent Number: 5,013,496
[45] Date of Patent: May 7, 1991

[54] PROCESS FOR MOLDING A HIGHLY-REFRACTIVE PLASTIC LENS

[75] Inventors: Teruyuki Nagata; Koju Okazaki, both of Omuta; Nobuyuki Kajimoto; Tohru Miura, both of Yokohama; Yoshinobu Kanemura; Katsuyoshi Sasagawa, both of Yokohama, all of Japan

[73] Assignee: Mitsui Toatsu Chemicals, Inc., Tokyo, Japan

[21] Appl. No.: 310,388

[22] Filed: Feb. 15, 1989

[30] Foreign Application Priority Data

Feb. 22, 1988 [JP] Japan ................................. 62-37515
Feb. 22, 1988 [JP] Japan ................................. 63-37523
Feb. 22, 1988 [JP] Japan ................................. 63-37525

[51] Int. Cl.$^5$ ............................................. B29D 11/00
[52] U.S. Cl. ..................................... 264/2.3; 264/1.1; 523/106
[58] Field of Search ................... 264/2.3, 1.1; 523/106

[56] References Cited

U.S. PATENT DOCUMENTS

| 2,542,386 | 2/1951 | Beattie | 264/2.3 |
| 3,944,637 | 3/1976 | Bond et al. | 264/2.3 |
| 4,146,696 | 3/1979 | Bond et al. | 264/2.3 |
| 4,342,863 | 8/1982 | Hohokabe et al. | 528/364 |
| 4,534,916 | 8/1985 | Wichterle | 264/2.3 |
| 4,689,387 | 8/1987 | Kajimoto et al. | 528/76 |
| 4,775,733 | 10/1988 | Kanemura et al. | 528/77 |
| 4,791,185 | 12/1988 | Kanemura et al. | 528/73 |

FOREIGN PATENT DOCUMENTS 267316 11/1987 Japan .

Primary Examiner—James Lowe
Attorney, Agent, or Firm—Burns, Doane, Swecker & Mathis

[57] ABSTRACT

A process for producing a plastic lens having a high refractive index and profile regularity which includes forming a mixture of one or more of sulfur-containing aromatic polyisocyanate compounds, one or more of active hydrogen compounds selected from the group consisting of polyol compounds and polythiol compounds, and at least one internal mold releasing agent. Then subjecting the resulting mixture to casting polymerization, to form the plastic lens.

5 Claims, No Drawings

PROCESS FOR MOLDING A HIGHLY-REFRACTIVE PLASTIC LENS

BACKGROUND OF THE INVENTION

1. Field of the Invention:

The present invention relates to a plastic lens and a process for making the plastic lens. More particularly, the invention relates to a process for making a plastic lens having urethane bonds or S-alkyl thiocarbamate bonds, and a lens produced by the process.

2. Description of the Prior Art:

It is known to use diethylene glycol-bis(allylcarbonate) (hereinafter referred to as DAC), PMMA and polycarbonate for preparing lenses. It is known to use an internal mold releasing agent such as butyl phosphate to improve the mold releasing properties upon molding these materials. However, internal molding agents are not required and result in impaired appearance of molded articles [Seiichi Mima, Polymer Digest, 3, 39 (1984); etc.].

Polyurethane base lenses exhibit high refractive described materials. However, polyurethane adheres to a mold upon molding, and thus it is difficult to release the lens from the mold after polymerization. With this phenomenon in view, the present inventors previously proposed a process in which an external mold releasing agent is used (Japanese Patent Laid-Open No. 267316/1987, etc.) and a process in which a polyolefin resin mold is used (Japanese Patent Laid-Open No. 236818/1987) to improve mold releasing properties.

However, these foregoing processes are still insufficient in casting polymerization of polyurethane base lenses.

In a process in which an external mold releasing agent is used, a surface treating material on the inner surface of a mold is transferred to the surface or interior of the polymerized lens, thus producing irregularity or unevenness on the surface of the lens or turbidity within the lens. Further, whenever the mold is used repeatedly, it requires mold releasing treatment, this making the process complicated for use in industrial applications and thus is very uneconomical due to the low productivity of the lens.

A polyolefin resin mold is deformed at elevated temperature so that the resulting molded lens has poor surface profile regularity. Thus, the lens is not suitable for use in applications in which a high degree of profile regularity is required.

SUMMARY OF THE INVENTION

The present invention overcomes the problems and disadvantages of the prior art by providing a process for producing a plastic lens having a high refractive index and exhibiting superior properties over prior art lenses.

It is an object of the invention to provide an efficient process for preparing a plastic lens which is suitable for use on an industrial scale.

It is a further object of the invention to provide a process for preparing a plastic lens which has a high degree of profile regularity and excellent optical characteristics, and a lens produced by the process.

It is also an object of the invention to provide a process for preparing a plastic lens that has a high refractive index, is lightweight, has excellent impact resistance and weatherability.

Additional objects and advantages of the invention will be set forth in part in the description which follows, and in part will be obvious from the description, or may be learned by practice of the invention. The objects and advantages of the invention will be realized and attained by means of the instrumentalities and combinations, particularly pointed out in the appended claims.

To achieve the objects and in accordance with the purpose of the invention, as embodied and broadly described herein, the invention provides a process for producing a plastic lens having a high refractive index comprising forming a mixture of (a) one or more of sulfurcontaining aromatic polyisocyanate compounds; (b) one or more of active hydrogen compounds selected from the group consisting of polyol compounds and polythiol compounds; and (c) at least one internal mold releasing agent; pouring the mixture into a mold and polymerizing the same to form a plastic lens. The process of the invention can be carried out efficiently and economically on an industrial scale and provides a plastic lens having a high refractive index, a high degree of profile regularity, excellent impact resistance and excellent optical characteristics, and being lightweight.

Detailed Description and Preferred Embodiment

Reference will now be made in detail to the present preferred embodiments of the invention. Exemplary suitable internal mold releasing agents for use in the present invention include fluorine-base nonionic surface active agents, silicon-base nonionic surface active agents, quaternary alkylammonium salts, acidic phosphates, liquid paraffins, waxes, higher fatty acids and metal salts thereof, higher fatty acid esters, higher fatty alcohols, bisamides, polysiloxanes, and aliphatic amine ethylene oxide additives. The internal mold releasing agents are selected in view of the combination of monomers and polymerization conditions employed, as well as the economical efficiency, and ease of handling of particular materials. The internal mold releasing agents may be used singly or as a mixture of two or more thereof.

The fluorine-containing nonionic surface active agent and silicon-containing nonionic surface active agent which may be used as the internal releasing agent in the process of the present invention are compounds each containing respectively a perfluoroalkyl group and a dimethylpolysiloxane group in the molecule. These compounds also contains individually a hydroxyalkyl group and a phosphoric ester group.

Commercially available suitable fluorinecontaining nonionic surface active agents include UNIDAIN TM DS-401 (product of Daikin Kogyo Co., Ltd.), UNIDAIN TM DS-403 (product of Daikin Kogyo Co., Ltd.), F-TOP TM EF122A (product of Shin Akita Chemical Co., Ltd.), F-TOP TM EF126 (product of Shin Akita Chemical Co., Ltd.) and F-TOP TM EF301 (product of Shin Akita Chemical Co., Ltd.). A commercially available suitable silicon-containing nonionic surface active agent is Q2-120A, a trial product of the Dow Chemical Company.

The quaternary alkylammonium salt useful in the practice of the present invention is generally known as a cationic surface active agent and includes the halides, phosphates and sulfates of quaternary alkylammoniums. Exemplary suitable chlorides include trimethylcetylammonium chloride, trimethylstearylammonium chloride, dimethylethylcetylammonium chloride, triethyldodecylammonium chloride, trioctylmethylammonium chloride and diethylcyclohexyl-dodecylammonium chloride.

Exemplary suitable acidic phosphates useful in the practice of the present invention include isopropyl acid phosphate, diisopropyl acid phosphate, butyl acid phosphate, dibutyl acid phosphate, octyl acid phosphate, dioctyl acid phosphate, isodecyl acid phosphate, diisodecyl acid phosphate, tridecanol acid phosphate, and bis(tridecanol-acid) phosphate.

Exemplary suitable metal salts of higher fatty acids useful in the process of the present invention include zinc salts, calcium salts, magnesium salts, nickel salts and copper salts of stearic acid, oleic acid, octanoic acid, lauric acid, behenic acid and ricinoleic acid, such as zinc stearate, zinc oleate, zinc palmitate, zinc laurate, calcium stearate, calcium oleate, calcium palmitate, calcium laurate, magnesium stearate, magnesium oleate, magnesium laurate, magnesium palmitate, nickel stearate, nickel oleate, nickel palmitate, nickel laurate, copper stearate, copper oleate, copper laurate and copper palmitate.

Exemplary suitable higher fatty acid esters useful in the practice of the process of the present invention include esters of higher fatty acids such as stearic acid, oleic acid, octanoic acid, lauric acid and ricinoleic acid and alcohols such as ethylene glycol, dihydroxypropane, dihydroxybutane, neopentyl glycol and dihydroxyhexane.

The internal mold releasing agent is present in the process of the invention in an amount from about 0.1 to about 10,000 ppm, preferably from about 1 to about 5,000 ppm based on the total weight of the monomer mixture. If the amount is less than 0.1 ppm, it will be difficult to release the lens from the mold. Any amounts in excess of 10,000 ppm will lead to the formation of haze in the resulting lenses, early release of the resulting lenses from a mold during polymerization, and deterioration of profile regularity on the surface of the resulting lenses.

Exemplary suitable sulfur-containing aromatic polyisocyanate compounds include aromatic sulfide-type isocyanate compounds such as diphenylsulfide-2,4'-diisocyanate, diphenylsulfide-4,4'-diisocyanate, 3,3'-dimethoxy-4,4'-diisocyanatedibenzylthioether, bis(4-isocyanatemethylbenzene)sulfide and 4,4'-methoxybenzenethioethyleneglycol-3,3'-diisocyanate; aromatic disulfide-type isocyanates such as diphenyldisulfide-4,4'-diisocyanate, 2,2'-dimethyl-diphenyl-disulfide-5,5'-diisocyanate, 3,3'-dimethyldiphenyl-disulfide-5,5'-diisocyanate, 3,3'-dimethyldiphenyl-disulfide-6,6'-diisocyanate, 4,4'-dimethyldiphenyl-disulfide-5,5'-diisocyanate, 3,3'-dimethoxydiphenyl-disulfide-4,4'-diisocyanate and 4,4'-dimethoxydiphenyl-disulfide-3,3'-diisocyanate; aromatic sulfone-type isocyanates such as diphenylsulfone-4,4'-diisocyanate, diphenylsulfone-3,3'-diisocyanate, benzidinsulfone4,4'-diisocyanate, diphenylmethanesulfone-4,4'-diisocyanate, 4-methyl-diphenylsulfone-2,4'-diisocyanate, 4,4'-dimethoxydiphenylsulfone-3,3'-diisocyanate, 3,3'-dimethoxy-4,4'-diisocyanate-dibenzylsulfone, 4,4'-dimethyldiphenylsulfone-3,3'-diisocyanate, 4,4'-di-tertbutyldiphenylsulfone-3,3'-diisocyanate, 4,4'-methoxybenzeneethylenedisulfone-3,3'-diisocyanate and 4,4'-dichlorodiphenylsulfone-3,3'-diisocyanate; sulfonic ester-type isocyanates such as 4-methyl-3-isocyanatebenzenesulfonyl-4'-isocyanate-phenol ester, 4-methoxy-3-isocyanatebenzenesulfonyl-4'-isocyanate-phenol ester; aromatic sulfonic amides such as 4-methyl-3-isocyanatebenzene-sulfonylanilide-3'-methyl-4'-isocyanate, dibenzenesulfonyl-ethylenediamine-4,4'-diisocyanate, 4,4'-methoxybenzenesulfonyl-ethylenediamine-3,3'-diisocyanate, and 4-methyl-3-isocyanatebenzenesulfonyl-anilide-4-methyl-3'-isocyanate; sulfur-containing heterocyclic compounds such as thiophene-2,5-diisocyanate; and 1,4-dithian-2,5-diisocyanate.

Halogen-substituted compounds such as chlorine-substituted, bromine-substituted, alkyl-substituted, alkoxy-substituted and nitro-substituted bifunctional or polyfunctional aromatic polyisocyanated compounds and prepolymer-type modified products with polyhydric alcohols, carbodiimide-modified products, urea-modified products, biuret-modified products and dimerization or trimerization products of aromatic polyisocyanate compounds are also suitable for use in the process of the invention.

These polyisocyanate compounds may be used singly or as a mixture of two or more thereof.

Exemplary suitable polyol compounds for use in the process of the present invention include ethylene glycol, diethylene glycol, propylene glycol, dipropylene glycol, butylene glycol, neopentyl glycol, glycerol, trimethylolethane, trimethylolpropane, butanetriol, 1,2-methylglucoside, pentaerythritol, dipentaerythritol, tripentaerythritol, sorbitol, erythritol, threitol, ribitol, arabinitol, xylitol, allitol, mannitol, dorsitol, iditol, glycol, inositol, hexanetriol, triglycerol, diglycerol, triethylene glycol, polyethylene glycol, tris(2-hydroxyethyl)isocyanurate, cyclobutanediol, cyclopentanediol, cyclohexanediol, cycloheptanediol, cyclooctanediol, cyclohexanedimethanol, hydroxypropylcyclohexanol, tricyclo[5,2,1,0$^{2,6}$]decane-dimethanol, bicyclo[4,3,0]-nonanediol, dicyclohexanediol, tricyclo[5,3,1,1]-dodecanediol, bicyclo[4,3,0]-nonanedimethanol, tricyclo[5,3,1,1]dodecane-diethanol, hydroxypropyltricyclo[5,3,1,1]-dodecanol, spiro[3,4]-octanediol, butylcyclohexanediol, 1,1'-bicyclohexylidenediol, cyclohexanetriol, maltitol, lactitol, dihydroxynaphthalene, trihydroxynaphthalene, tetrahydroxynaphthalene, dihydroxybenzene, benzenetriol, biphenyltetraol, pyrogallol, (hydroxynaphthyl)pyrogallol, trihydroxyphenanthrene, bisphenol A, bisphenol F, xylylene glycol, di(2-hydroxyethoxy)benzene, bisphenol A-bis-(2-hydroxyethyl ether), tetrabromo-bisphenol A, tetrabromo-bisphenol A-bis(2-hydroxyethyl ether), dibromoneopentyl glycol, and epoxy resins.

Condensation products of the above-described polyols with organic polybasic acids such as oxalic acid, glutamic acid, adipic acid, acetic acid, propionic acid, cyclohexanecarboxylic acid, β-oxocyclohexanepropionic acid, dimeric acid, phthalic acid, isophthalic acid, salicylic acid, 3-bromopropionic acid, 2-bromoglycolic acid, dicarboxycyclohexane, pyromellitic acid, butanetetracarboxylic acid and bromophthalic acid, addition products of the above-described polyols with alkylene oxides such as ethylene oxide and propylene oxide, addition products of alkylene polyamines with alkylene oxides such as ethylene oxide and propylene oxide are also suitable for use in the process of the invention.

Halogen-substituted polyol compounds such as chlorine-substituted and bromine-substituted polyol compounds may also be employed.

Exemplary suitable polythiol compounds having no sulfur atom except the mercapto group for use in the invention include methanedithiol, 1,2-ethanedithiol, 1,1-propanedithiol, 1,2-propanedithiol, 1,3-propanedithiol, 2,2-propanedithiol, 1,6-hexanedithiol, 1,2,3-propanetrithiol, 1,1-cyclohexanedithiol, 1,2-cyclohexanedithiol, 2,2-dimethylpropane-1,3-dithiol, 3,4-dimethoxybutane-1,2-dithiol, 2-methylcyclohexane2,3-dithiol, bicyclo[2,2,1]-hepta-exo-cis-2,3-dithiol, 1,1-bis(-mercaptomethyl)cyclohexane, thiomalic acid-bis(2-mercaptoethyl ester), 2,3-dimercaptosuccinic acid(2-mercaptoethyl ester), 2,3-dimercapto-1-propanol(2-mercaptoacetate), 2,3-dimercapto-1-propanol(3-mercaptoacetate), diethyleneglycol-bis(2-mercaptoacetate), diethyleneglycol-bis(3-mercaptopropionate), 1,2-dimercaptopropylmethyl ether, 2,3-dimercaptopropylmethyl ether, 2,2-bis(mercaptomethyl)-1,3-propanedithiol, bis(2-mercaptoethyl)ether, ethyleneglycol-bis(2-mercaptoacetate), ethyleneglycol-bis(3-mercaptopropionate), trimethylolpropane-tris(2-mercaptoacetate), trimethylolpropane-tris(3-mercaptopropionate), pentaerythritol(3-mercaptopropionate), and pentaerythritol-tetrakis(3-mercaptopropionate), and the halogen substituted aliphatic polythiol compounds such as chlorine and bromine substituted aliphatic polythiols.

Aromatic polythiol compounds such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,2-bis(mercaptomethyleneoxy)benzene, 1,3-bis(mercaptomethyleneoxy)benzene, 1,4-bis(mercaptomethyleneoxy)benzene, 1,2-bis(mercaptoethyleneoxy)benzene, 1,3-bis(mercaptoethyleneoxy)benzene, 1,4-bis(mercaptoethyleneoxy)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,2,4-tris(mercaptoethyl)benzene, 1,3,5-tris(mercaptoethyl)benzene, 1,2,3-tris(mercaptomethyleneoxy)benzene, 1,2,3-tris(mercaptomethyleneoxy)benzene, 1,3,5-tris(mercaptomethyleneoxy)benzene, 1,2,3-tris(mercaptoethyleneoxy)benzene, 1,2,4-tris(mercaptoethyleneoxy)benzene, 1,3,5-tris(mercaptoethyleneoxy)benzene, 1,2,3,4-tetramercaptobenzene, 1,2,3,5-tetramercaptobenzene, 1,2,4,5-tetramercaptobenzene, 1,2,3,4-tetrakis(mercaptomethyl)benzene, 1,2,3,5-tetrakis(mercaptomethyl)benzene, 1,2,4,5-tetrakis(mercaptomethyl)benzene, 1,2,3,4-tetrakis(mercaptoethyl)benzene, 1,2,3,5-tetrakis(mercaptoethyl)benzene, 1,2,4,5-tetrakis(mercaptoethyl)benzene, 1,2,3,4-tetrakis(mercaptomethyleneoxy)benzene, 1,2,3,5-tetrakis(mercaptomethyleneoxy)benzene, 1,2,4,5-tetrakis(mercaptomethyleneoxy)benzene, 1,2,3,4-tetrakis(mercaptoethyleneoxy)benzene, 1,2,3,5-tetrakis(mercaptoethyleneoxy)benzene, 1,2,4,5-tetrakis(mercaptodimercaptobiphenyl, 2,2'-dimercaptobiphenyl, 4,4'-dimercaptobibenzyl, 4,4'-dimercaptobibenzyl, 2,5-toluenedithiol, 3,4-toluenedithiol, 1,4-naphthalenedithiol, 1,5-naphthalenedithiol, 2,6-naphthalenedithiol, 2,7-naphthalenedithiol, 2,4-dimethylbenzene-1,3-dithiol, 4,5-dimethylbenzene-1,3-dithiol, 9,10-anthracenedimethanethiol, 1,3-di(p-methoxyphenyl)-propane-2,2-dithil, 1,3-diphenylpropane-2,2-dithiol, phenylmethane-1,1-dithiol and 2,4-di(p-mercaptophenyl)pentane, halogen-substituted aromatic polythiols including the chlorine or bromine substituted polythiols such as 2,5-dichlorobenzene1,3-dithiol, 1,3-di(p-chlorophenyl)propane-2,2-dithiol, 3,4,5-tribromo-1,2-dimercaptobenzene and 2,3,4,6-tetrachloro-1,5-bis(mercaptomethyl)benzene, and heterocyclic polythiols such as 2-methylamino-4,6-dithiolsym-triazine, 2-ethylamino-4,6-dithiol-sym-triazine, 2-amino-4,6-dithiol-sym-triazine, 2-morpholino-4,6-dithiol-sym-triazine, 2-cyclohexylamino-4,6-dithiolsym-triazine, 2-methoxy-4,6-dithiol-sym-triazine, 2-phenoxy-4,6-dithiol-sym-triazine, 2-thiobenzyloxy-4,6-dithiol-sym-triazine and 2-thiobutyloxy-4,6-dithiol-sym-triazine, and halogen substituted polythiols such as chlorine substituted and bromine substituted polythiols are also suitable for use in the process of the present invention.

Exemplary suitable polythiol compounds having at least one sulfur atom in addition to the mercapto groups include 1,2-bis(mercaptomethylthio)benzene, 1,3-bis(-mercaptomethylthio)benzene, 1,4-bis(mercaptomethylthio)benzene, 1,2-bis(mercaptoethylthio)benzene, 1,3-bis(mercaptoethylthio)benzene, 1,4-bis(mercaptoethylthio)benzene, 1,2,3-tris(mercaptomethylthio)benzene, 1,2,4-tris(mercaptomethylthio)benzene, 1,3,5-tris(mercaptomethylthio)benzene, 1,2,3-tris(mercaptoethylthio)benzene, 1,2,4-tris(mercaptoethylthio)benzene, 1,3,5-tris(mercaptoethylthio)benzene, bis(mercaptomethyl)disulfide, bis(mercaptoethyl)disulfide, bis(mercaptopropyl)disulfide, and the esters of these polythiols with thioglycolic acid and mercaptopropionic acid, aromatic polythiols such as hydroxymethylsulfide-bis(2-mercaptoacetate), hydroxymethylsulfide-bis(3-mercaptopropionate), hydroxyethylsulfide-bis(2-mercaptoacetate), hydroxyethylsulfide-bis(3-mercaptopropionate), hydroxypropylsulfide-bis(2-mercaptoacetate), hydroxypropylsulfide-bis(3-mercaptopropionate), hydroxymethyldisulfide-bis(2-mercaptoacetate), hydroxymethyldisulfide-bis(3-mercaptopropionate), hydroxyethyldisulfide-bis(2-mercaptoacetate), hydroxyethyldisulfide-bis(3-mercaptopropionate), hydroxypropyldisulfide-bis(2-mercaptoacetate), hydroxypropyldisulfide-bis(3-mercaptopropionate), 2-mercaptoethylether-bis(2-mercaptoacetate), 2-mercaptoethylether-bis(3-mercaptopropionate), 1,2,3,4-tetrakis(mercaptomethylthio)benzene, 1,2,3,5-tetrakis(mercaptomethylthio)benzene, 1,2,4,5-tetrakis(mercaptomethylthio)benzene, 1,2,3,4-tetrakis(mercaptoethylthio)benzene, 1,2,3,5-tetrakis(mercaptoethylthio)benzene and 1,2,4,5-tetrakis(mercaptoethylthio)benzene, and the nucleusalkylated products of these polythiols.

Aliphatic polythiols such as bis(mercaptomethyl)sulfide, bis(mercaptoethyl)sulfide, bis(mercaptopropyl)sulfide, bis(mercaptomethylthio)methane, bis(2mercaptoethylthio)methane, bis(3-mercaptopropylthio)methane, 1,2-bis(mercaptomethylthio)ethane, 1,2-bis(2-mercaptoethylthio)ethane, 1,2-bis(3-mercaptopropylthio)ethane, 1,3-bis(mercaptomethylthio)propane, 1,3-bis(2-mercaptoethylthio)propane, 1,3-bis(3-mercaptopropylthio)propane, 1,2,3-tris(mercaptomethylthio)propane, 1,2,3-tris(2-mercaptoethylthio)propane, 1,2,3-tris(3mercaptopropylthio)propane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl)sulfide, 2,5-dimercapto-1,4-dithian, 1,4-dithian-2,5-diol-bis(2-mercaptoacetate), 1,4-dithian-2,5-diol-bis(3-mercaptopropionate), thiodiglycolic acid-bis(2-mercaptoethyl ester), thiodipropionic acid-bis(2-mercaptoethyl ester), 4,4-thiodibutyric acid-bis(2-mercaptoethyl ester), dithiodiglycolic acid-bis(2-mercaptoethyl ester), dithiodipropionic acid-bis(2-mercaptoethyl ester), 4,4-dithiodibutyric acid-bis(2-mercaptoethyl ester), thiodiglycolic acid-bis(2,3-dimercaptopropyl ester), thiodipropionic acid-bis(2,3-dimercaptopropyl ester), thiodiglycolic acid-bis-(2,3-dimercaptopropyl ester) and dithiodipropion-bis(2,3-dimercaptopropyl ester), heterocyclic compounds such as 3,4-thiophenedithiol, bithmuthiol and 2,5-dimercapto1,3,4-thiadiazole, and halogen substituted polythiols such as chlorine substituted and bromine substituted compounds may also be employed in the process of the present invention.

These active hydrogen compounds may be used singly or as a mixture of two or more thereof.

The molar ratio of the functional groups of the sulfur-containing aromatic polyisocyanate compound to the active hydrogen compound is from about 0.5 to about 3.0, preferably from about 0.5 to about 1.5 NCO/(SH+OH).

The plastic lens of the present invention is made of a resin containing principally urethane bonds each comprising an isocyanate group and a hydroxyl group or S-alkyl thio-carbomate bonds each comprising an isocyanate group and a mercapto group. As a matter of course, the resin may contain allophanate bonds, urea bonds, biuret bonds, in addition to the above-described two kinds of bonds.

The urethane bonds or S-alkyl thiocarbamate bonds may be further reacted with isocyanate groups to increase the cross-linking density. In this case, the reaction temperature should be raised to at least 100° C. and the isocyanate component should be used in an excess amount. Further, an amine or the like may be used in combination to partially form urea bonds or biuret bonds. It is however necessary to pay particular attention to coloring when an aromatic polyisocyanate compound is reacted with a compound other than a polyol or polythiol compound.

Agents such as a chain-extender, cross-linking agent, light stabilizer, ultraviolet absorber, anti-oxidizing agent, oil soluble dye and filler may be added to achieve desired properties in the lens.

The reaction velocity rate may be controlled by adding a reaction catalyst used in the production of polyurethane or S-alkyl thiocarbamate and is wellknown in the art.

The plastic lens of the present invention can be obtained by a casting polymerization process. Specifically, one or more of sulfur-containing aromatic polyisocyanate compounds, one or more of active hydrogen compounds and at least one internal mold releasing agent are mixed to form a mixture, and the resulting mixture is poured into a mold and is polymerized.

The polymerization temperature and time depend on the types of monomers and additives employed including the mold releasing agent. However, the polymerization time is generally from about 0.5 to about 72 hours at a polymerization temperature of from about $-20°$ C. to about 200° C., preferably from about room temperature to about 150° C., most preferably from about 50° C. to about 120° C. It is also possible to anneal the polymerized lenses, if necessary.

The plastic lenses of the present invention have high degrees of profile regularity and excellent optical characteristics, are lightweight and superb in impact resistance, and are hence suitable for use in optical elements such as eyeglass lenses and camera lenses.

The plastic lens of the present invention may undergo physical or chemical treatment such as surface abrasive finishing, antistatic treatment, hard coat treatment, non-reflective coat treatment, coloring treatment and dimming treatment in order to improve or impact such properties such as anti-reflection, high hardness, abrasion resistance, chemical resistance, fog resistance and fashionability, as required.

EXAMPLES

The present invention will be further clarified and described in more detail by the following Examples and Comparative Examples which are intended to be purely exemplary of the invention. The performance tests of the resultant lenses, refraction index, Abbe's number, mold releasing property and appearance were measured in accordance with the following testing methods.

Refraction index and Abbe's number: Measured at 20° C. by means of a Pulfrich refractometer.

Mold releasing property: After completion of polymerization, a TEFLON TM made wedge was driven between a lens and a mold. Mold releasing property was evaluated as follows: released easily without any resistance—(O); and not released wholly or even partially—(X).

Appearance: observed with the eye.

EXAMPLE 1

After mixing 24.2 g (0.09 mole) of diphenylsulfide-4,4'-diisocyanate, 8.0 g (0.06 mole) of trimethylolpropane and 0.032 g (1,000 ppm) of isopropyl acid phosphate, the resulting mixture was poured into a mold composed of a glass mold and a gasket. The mixture was heated slowly from room temperature to 120 taking 28 hours to complete the polymerization. After polymerization, a lens was released with ease. The lens thus-obtained was colorless and transparent and had excellent profile regularity. It had a refraction index of $n_D^{20}=1.61$, an Abbe's number of $v_D^{20}=32$ and a specific gravity of 1.27.

EXAMPLES 2-11

Lenses were made in accordance with the compositions given in Table 1 in the same manner as in Example 1. The results of performance tests are shown in Table 1

COMPARATIVE EXAMPLES 1-12

Lenses were made in accordance with the compositions given in Table 2 in the same manner as Example 1 except for the mold treatment shown in Table 2. The results are given in Table 2.

In Comparative Examples, lenses were poorly released from molds due to the absence of any internal mold releasing agent, so that the lenses thus released had irregularities on their surfaces.

In Table 2, the description in the column "Mold treatment" signifies as follows:

(1) No treatment:
  A glass mold was used in the absence of mold releasing agent.

(2) External mold releasing treatment:
  The inner surface of a glass mold was coated with an external mold releasing agent, YSR-6209 manufactured by Toshiba Silicone Co., and baked.

(3) External mold releasing treatment & reuse:
  A glass mold was subjected to the external mold releasing treatment and used for polymerization. Thereafter, it was used again for polymerization without any treatment.

(4) Use of PP-mold:
  Polypropylene was injection-molded to form a mold, which was used in place of the glass mold.

Other embodiments of the invention will be apparent to the skilled in the art from consideration of the specification and practice of the invention disclosed herein. It is intended that the specification and examples be considered as exemplary only, with a true scope and spirit of the invention being indicated by the following claim.

TABLE 1

| Example | Polyisocyanate (mole) | Active hydrogen compound (mole) | Internal mold releasing agent (ppm) | Mold releasing property | Appearance | Refractive index | Abbe's number |
|---|---|---|---|---|---|---|---|
| 1 | diphenylsulfide-4,4'-diisocyanate (0.09) | trimethylolpropane (0.06) | isopropylacid-phosphate (1,000) | | good profile regularity colorless & transparent | 1.61 | 32 |
| 2 | diphenylsulfide-4,4'-diisocyanate (0.09) | tris(2-hydroxyethyl)-isocyanurate (0.06) | trioctylmethyl-ammoniumchloride (500) | | good profile regularity colorless & transparent | " | " |
| 3 | OCN–C6H4–S–C6H4–NCO (0.08) | S(CH$_2$CHCH$_2$SH)$_2$ (0.04) with SH | trioctylmethyl-ammoniumchloride (500) | | good profile regularity colorless & transparent | 1.68 | 29 |
| 4 | OCN–C6H4–S–C6H4–NCO (0.08) | C(CH$_2$OCCH$_2$CH$_2$SH)$_4$ (0.05) | Q2-120A (Dow) (200) | | good profile regularity colorless & transparent | 1.64 | 32 |
| 5 | OCN–C6H4–S–C6H4–NCO (0.05) | HSCH$_2$–C6H4–CH$_2$SH (0.04) + trimethylolpropane (0.007) | dibutylacid-phosphate (500) | | good profile regularity colorless & transparent | 1.68 | 28 |
| 6 | OCN–C6H4–S–S–C6H4–NCO (0.05) | C(CH$_2$OCCH$_2$CH$_2$SH)$_4$ (0.02) + HSCH$_2$–C6H4–CH$_2$SH (0.01) | Unidain DS-403 (Daikin) (100) | | good profile regularity colorless & transparent | 1.62 | 32 |
| 7 | OCN–C6H4–SO$_2$–C6H4–NCO (0.05) | diethylene glycol (0.02) + trimetholpropane (0.02) | isopropylacid-phosphate (800) | | good profile regularity colorless & transparent | 1.60 | 32 |
| 8 | OCN–C6H4–S–C6H4–NCO (0.05) | C(CH$_2$SCH$_2$CH$_2$SH)$_4$ (0.01) + trimethylolpropane (0.02) | isopropylacid-phosphate (800) | | good profile regularity colorless & transparent | 1.64 | 30 |

TABLE 1-continued

| Example | Polyisocyanate (mole) | Active hydrogen compound (mole) | Internal mold releasing agent (ppm) | Mold releasing property | Appearance | Refractive index | Abbe's number |
|---|---|---|---|---|---|---|---|
| 9 | OCN–C₆H₃(Me)–SO₂–C₆H₄–NCO (0.08) | C(CH₂SCH₂CH₂SH)₄ (0.02) + C(CH₂OCOCH₂CH₂SH)₄ (0.02) | isopropylacid-phosphate (800) | | good profile regularity colorless & transparent | 1.63 | 29 |
| 10 | OCN–C₆H₃(Me)–S(O)(OH)=N–C₆H₄–NCO (0.08) | C(CH₂SCH₂CH₂SH)₄ (0.02) + S(CH₂CHCH₂SH)₂ with SH (0.02) | isopropylacid-phosphate (800) | | good profile regularity colorless & transparent | 1.62 | 30 |
| 11 | OCN–C₆H₄–S–C₆H₄–NCO (0.04) + OCN–C₆H₄–S–S–C₆H₄–NCO (0.04) | C(CH₂OCOCH₂CH₂SH)₄ (0.04) | isopropylacid-phosphate (800) | | good profile regularity colorless & transparent | 1.63 | 32 |

TABLE 2

| Comparative Example | Polyisocyanate (mole) | Active hydrogen compound (mole) | Mold treatment | Mold releasing property | Appearance | Refractive index | Abbe's number |
|---|---|---|---|---|---|---|---|
| 1 | OCN—⟨C6H4⟩—S—⟨C6H4⟩—NCO (0.09) | trimethylolpropane (0.02) | no treatment | X | surface irregularity, colorless & transparent | — | — |
| 2 | OCN—⟨C6H4⟩—S—⟨C6H4⟩—NCO (0.09) | trimethylolpropane (0.02) | external mold releasing treatment | | surface irregularity, colorless & transparent | 1.61 | 32 |
| 3 | OCN—⟨C6H4⟩—S—⟨C6H4⟩—NCO (0.09) | trimethylolpropane (0.02) | external mold releasing treatment & reuse (Comp. Ex. 2) | X | — | — | — |
| 4 | OCN—⟨C6H4⟩—S—⟨C6H4⟩—NCO (0.09) | trimethylolpropane (0.02) | use of PP mold | | poor profile regularity, colorless & tramsparent | 1.61 | 32 |
| 5 | OCN—⟨C6H4⟩—S—⟨C6H4⟩—NCO (0.08) | $C(CH_2OCCH_2CH_2SH)_4$ $\parallel$ $O$ (0.04) | no treatment | X | — | — | — |
| 6 | OCN—⟨C6H4⟩—S—⟨C6H4⟩—NCO (0.08) | $C(CH_2OCCH_2CH_2SH)_4$ $\parallel$ $O$ (0.04) | external mold releasing treatment | | surface irregularity, colorless & tramsparent | 1.64 | 32 |
| 7 | OCN—⟨C6H4⟩—S—⟨C6H4⟩—NCO (0.08) | $C(CH_2OCCH_2CH_2SH)_4$ $\parallel$ $O$ (0.04) | external mold releasing treatment & reuse (Comp. Ex. 6) | X | — | — | — |
| 8 | OCN—⟨C6H4⟩—S—⟨C6H4⟩—NCO (0.08) | $C(CH_2OCCH_2CH_2SH)_4$ $\parallel$ $O$ (0.04) | use of PP mold | | poor profile regularity, colorless & transparent | 1.64 | 32 |
| 9 | OCN—⟨C6H4⟩—S—⟨C6H4⟩—NCO (0.08) | $S(CH_2CHCH_2SH)_2$ $\vert$ $SH$ (0.04) | no treatment | X | — | — | — |
| 10 | OCN—⟨C6H4⟩—S—⟨C6H4⟩—NCO (0.08) | $S(CH_2CHCH_2SH)_2$ $\vert$ $SH$ (0.04) | external mold releasing treatment | | surface irregularity, colorless & transparent | 1.68 | 29 |
| 11 | OCN—⟨C6H4⟩—S—⟨C6H4⟩—NCO (0.08) | $S(CH_2CHCH_2SH)_2$ $\vert$ $SH$ (0.04) | external mold releasing treatment & reuse (Comp. Ex. 10) | X | — | — | — |
| 12 | OCN—⟨C6H4⟩—S—⟨C6H4⟩—NCO (0.08) | $S(CH_2CHCH_2SH)_2$ $\vert$ $SH$ (0.04) | use of PP mold | | poor profile regularity, colorless & transparent | 1.68 | 29 |

What is claimed is:

1. A process for producing a plastic lens characterized by adding at least one internal mold releasing agent selected from the group consisting of fluorine-containing nonionic surface active agents, silicon-containing nonionic surface active agents, quaternary alkylammonium slats and acidic phosphates to a mixture of one or more of sulfur-containing aromatic polyisocyanate compounds and one or more of active hydrogen compounds selected from the group consisting of polyol compounds and polythiol compounds followed by casting polymerization in a lens mold so as to form a plastic lens.

2. The process of claim 1 wherein the polythiol compounds are polythiol compounds having at least one sulfur atom in addition to the mercapto groups.

3. The process of claim 1 wherein the proportion of the sulfur-containing aromatic polyisocyanate compounds to the active hydrogen compounds is a molar ratio of from about 0.5 to about 3.0 moles of functional isocyanate group per mole of functional (SH+OH) group.

4. The process of claim 1 wherein the internal mold releasing agent is present in an amount of from about 0.1 to about 10,000 ppm per sum of the sulfurcontaining aromatic polyisocyanate compounds and the active hydrogen compounds.

5. The process of claim 1 wherein casting polymerization is carried out at a temperature of from about −20° C. to about 200° C.

* * * * *

UNITED STATES PATENT AND TRADEMARK OFFICE
CERTIFICATE OF CORRECTION

PATENT NO. : 5,013,496

DATED : May 7, 1991

INVENTOR(S) : Nagata et al.

It is certified that error appears in the above-identified patent and that said Letters Patent is hereby corrected as shown below:

In Column 13, line 66, amend "slats" to --salts--.

Signed and Sealed this

Thirteenth Day of April, 1993

Attest:

STEPHEN G. KUNIN

*Attesting Officer*  *Acting Commissioner of Patents and Trademarks*